US012421836B2

(12) United States Patent
Claxton

(10) Patent No.: US 12,421,836 B2
(45) Date of Patent: Sep. 23, 2025

(54) SAND TRAP

(71) Applicant: B&D Flowback, LLC, Longview, TX (US)

(72) Inventor: Chase Claxton, Longview, TX (US)

(73) Assignee: B&D Flowback, LLC, Longview, TX (US)

( * ) Notice: Subject to any disclaimer, the term of this patent is extended or adjusted under 35 U.S.C. 154(b) by 406 days.

(21) Appl. No.: 18/110,970

(22) Filed: Feb. 17, 2023

(65) Prior Publication Data

US 2024/0254871 A1 Aug. 1, 2024

Related U.S. Application Data

(60) Provisional application No. 63/441,667, filed on Jan. 27, 2023.

(51) Int. Cl.
*E21B 43/34* (2006.01)
*B04C 3/06* (2006.01)
*B04C 11/00* (2006.01)

(52) U.S. Cl.
CPC ................ *E21B 43/35* (2020.05); *B04C 3/06* (2013.01); *B04C 11/00* (2013.01)

(58) Field of Classification Search
None
See application file for complete search history.

(56) References Cited

U.S. PATENT DOCUMENTS

| | | | | |
|---|---|---|---|---|
| 11,124,430 | B2 * | 9/2021 | Lolling | B01D 1/14 |
| 2021/0010364 | A1 * | 1/2021 | Sinker | B01D 21/00 |
| 2022/0362821 | A1 * | 11/2022 | Chiodini | C12M 45/04 |
| 2025/0116577 | A1 * | 4/2025 | Farrell | G01N 1/2205 |

* cited by examiner

*Primary Examiner* — Krishnan S Menon
(74) *Attorney, Agent, or Firm* — Braxton Perrone, LLC; Bobby W. Braxton; Gregory Perrone

(57) ABSTRACT

A system and method for a sand trap. The sand trap has a separator, an adjustment block upstream of the separator, an inlet stream upstream of the adjustment block, and a first removable nozzle within the adjustment block. The removable nozzle can be modified as necessary to optimize separation within the sand trap. The method includes determining a first optimal diameter for a first removable nozzle and installing the first removable nozzle into said adjustment block. Next, a second optimal diameter for a second removable nozzle is determined. The first removable nozzle is removed and the second removable nozzle is installed.

20 Claims, 5 Drawing Sheets

SAND TRAP

PRIORITY

The present invention claims priority to U.S. Provisional Application No. 63/441,667 filed Jan. 27, 2023, the entirety of which is hereby incorporated by reference.

BACKGROUND OF THE INVENTION

Technical Field

The present invention relates to a system and method for a sand trap.

Description of Related Art

Sand traps are used to remove particles from a stream. However, current sand trap designs are not optimized. Consequently, there is a need for a better sand trap.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
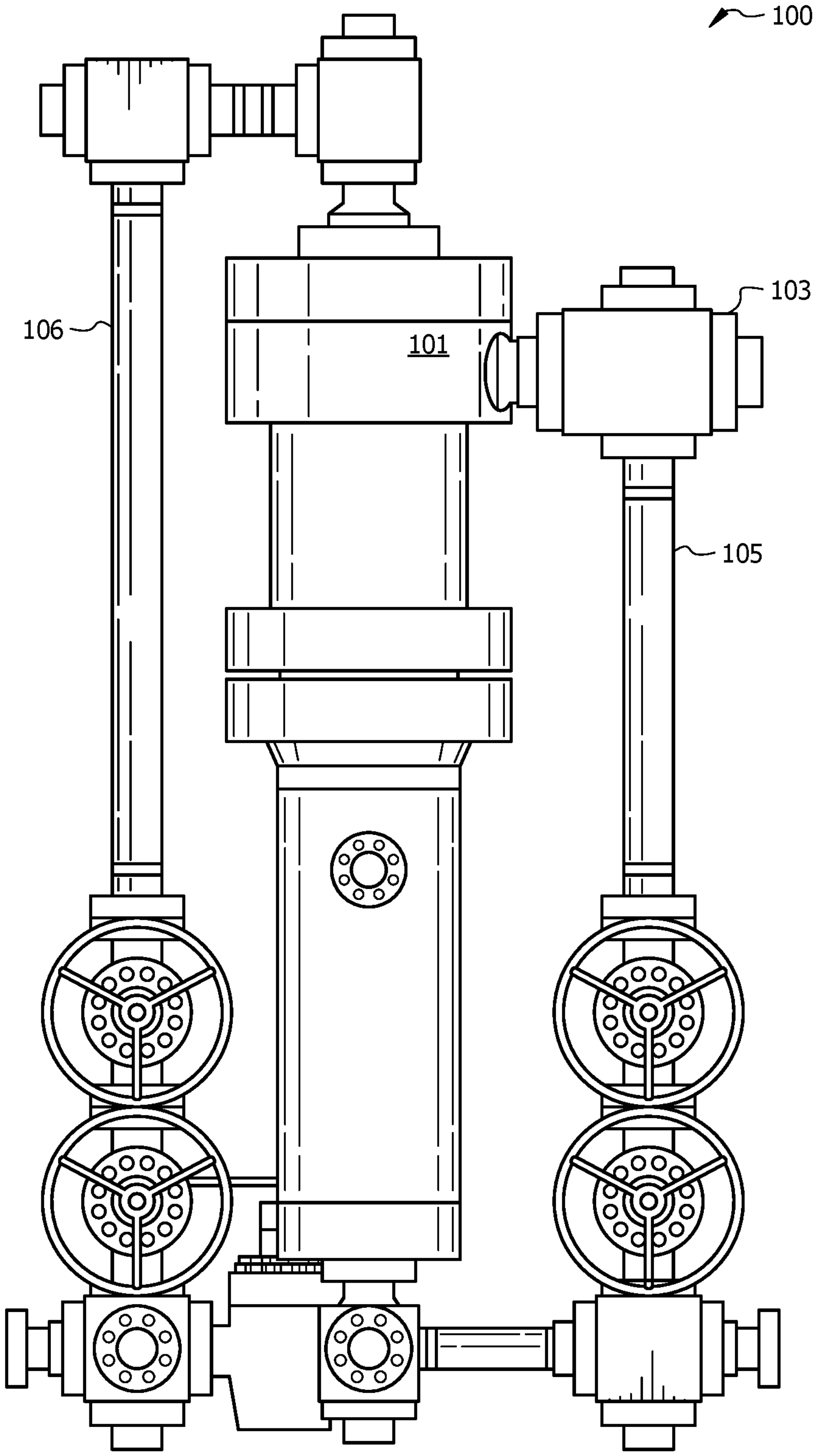
FIG. 1 is a side profile view of a sand trap in one embodiment.

FIG. 1 is a side profile view of a sand trap in one embodiment. A sand trap 100 is used to remove sand and other particulates from a fuel stream.

The sand trap 100, in one embodiment, utilizes a separator 101. A separator 101, as used herein, refers to a device which uses mass to separate two or more components in a fluid stream. Heavier components, such as sand, are separated from lighter components. Typically, the finer components are suspended in the stream, such as a gas stream.

In one embodiment the separator 101 comprises a vortex head. A fluid steam, such as a gas stream, enters the vortex head and rotates about the vortex. Heavier particles, such as sand, fall downward. In some embodiments the separator 101 comprises a chamber within the separator 101 collects the heavier components and stores them for subsequent removal.

The clean stream, or the stream which has had sand and other impurities removed, exits through the top of the separator 101, as depicted. The clean stream then flows through the outlet line 106.

Upstream of the separator 101 is an adjustment block 103. Upstream of the adjustment block 103, is the inlet stream 105. As used herein, upstream and downstream refer to relative locations in the process. Process equipment which occurs earlier in the process is referred to as upstream, whereas processes or equipment which occur later in the process are referred to as downstream. The inlet stream 105 is upstream of the adjustment block 103.

The inlet stream 105 carries a stream to the adjustment block 103. The inlet feed can comprise virtually any feed stream which contains sand and other undesirable impurities. In one embodiment the inlet feed comprises gas, natural gas, oil, produced saltwater, etc.

Previously, the inlet stream 105 was directed into the separator 101. The inlet stream 105 is directed at specified, and fixed, nozzle size. The nozzle size is calculated based upon a specific flow rate. However, the flow rate of the inlet stream 105, in many embodiments, fluctuates. The flow rate could be very slow during initial start-up. Then it can speed up. Similarly, the opposite can happen. The flow rate can be very high when the well is new and decrease with time. Thus, the specified nozzle size is not optimized across various flow rates or conditions. Rather, the specified nozzle size is only optimized for a moment in time. Consequently, in one embodiment, the system and method discussed herein utilizes an adjustable nozzle size.

Downstream of the inlet stream 105 is an adjustment block 103. This will be discussed in more detail in reference to FIG. 4. However, the adjustment block 103 allows for adjustment of the nozzle size. If the flow rate has decreased, for example, a user can adjust the adjustment block 103 to modify the nozzle size. The nozzle size can be optimized against pressure and flow rate to ensure optimal separation within the separator 101, as discussed in more detail below.

In one embodiment, the user removes a cover 107 on the adjustment block 103. The user can then make the necessary adjustments to the nozzle size. The user then re-installs the cover 107.

Figure 2:
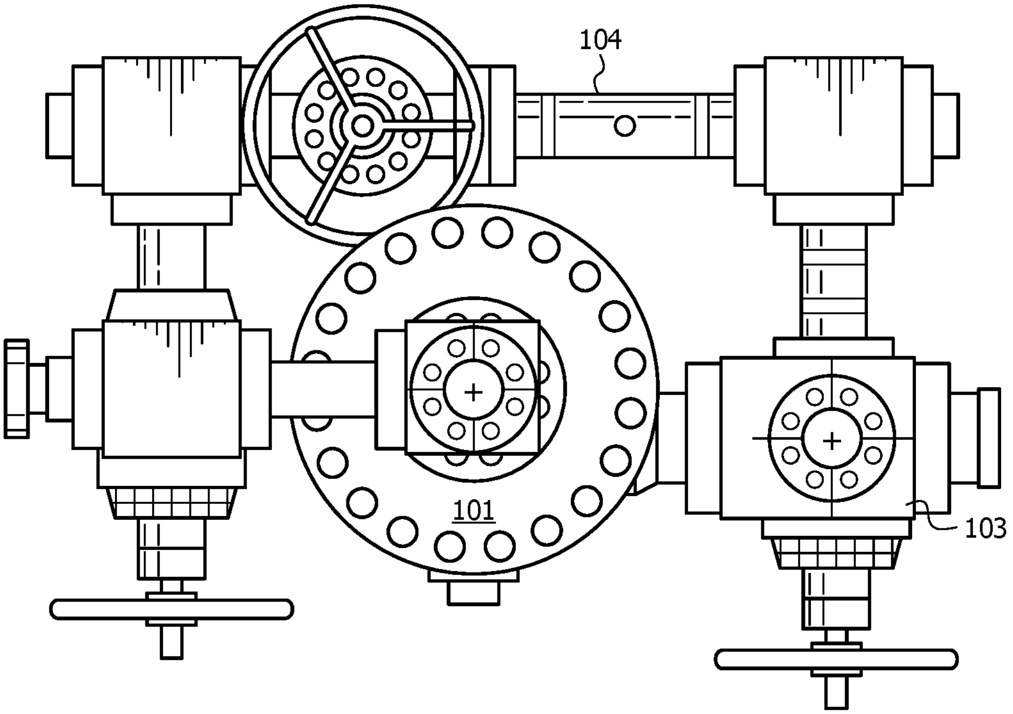
FIG. 2 is a top profile view of a sand trap in one embodiment.

Turning now to FIG. 2, FIG. 2 is a top profile view of a sand trap in one embodiment. As can be seen, FIG. 2 depicts an embodiment utilizing a bypass 104. The bypass 104, when opened, directs flow away from the adjustment block 103. In one embodiment, and as shown, the bypass 104 directs the flow away from the separator 101. The bypass 104 allows flow to bypass the adjustment block 103. Thus, when the adjustment block 103 is open, being adjusted, etc., the bypass 104 allows flow to continue. Otherwise, the entire operation would need to shut down when adjustments are made via the adjustment block 103. With the bypass 104, however, the flow can continue and momentarily bypasses the adjustment block 103 and the separator 101.

While one embodiment has been shown where the bypass stream bypasses the separator 101, in other embodiments the bypass 104 simply bypasses the adjustment block 103 but is still otherwise directed to the separator 101.

In some embodiments less than 15 minutes is required to make an adjustment to the nozzle size. Thus, flow via the bypass 104 is often short-lived.

Figure 3:
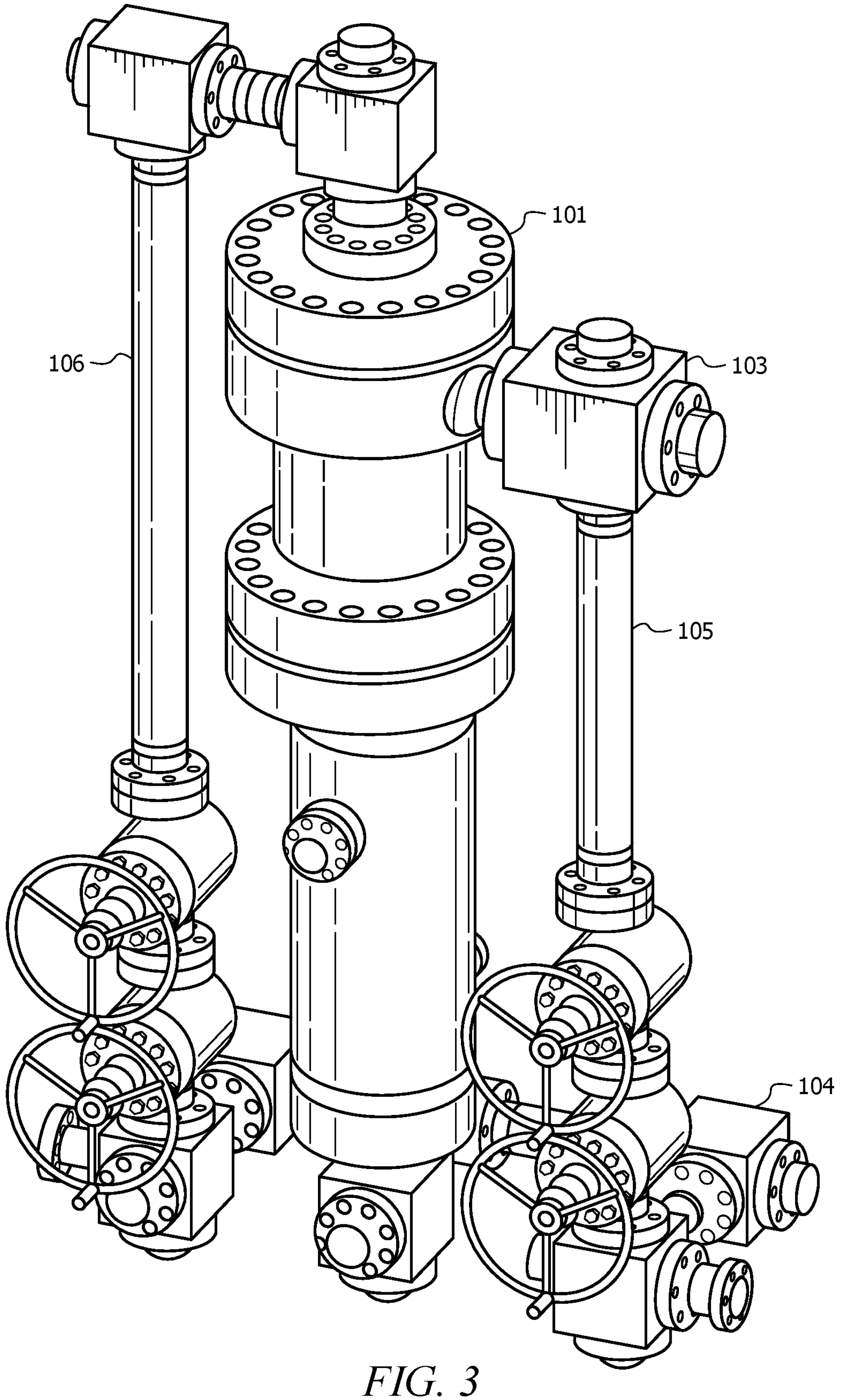
FIG. 3 is a perspective view of a sand trap in one embodiment.

FIG. 3 is a perspective view of a sand trap in one embodiment. As can be seen, various valves need to be opened or closed to stop flow to the adjustment block 103 and direct it to the bypass 104. The same procedure would need to be reversed to restore flow back to the adjustment block 103 and into the separator 101.

Figure 4:
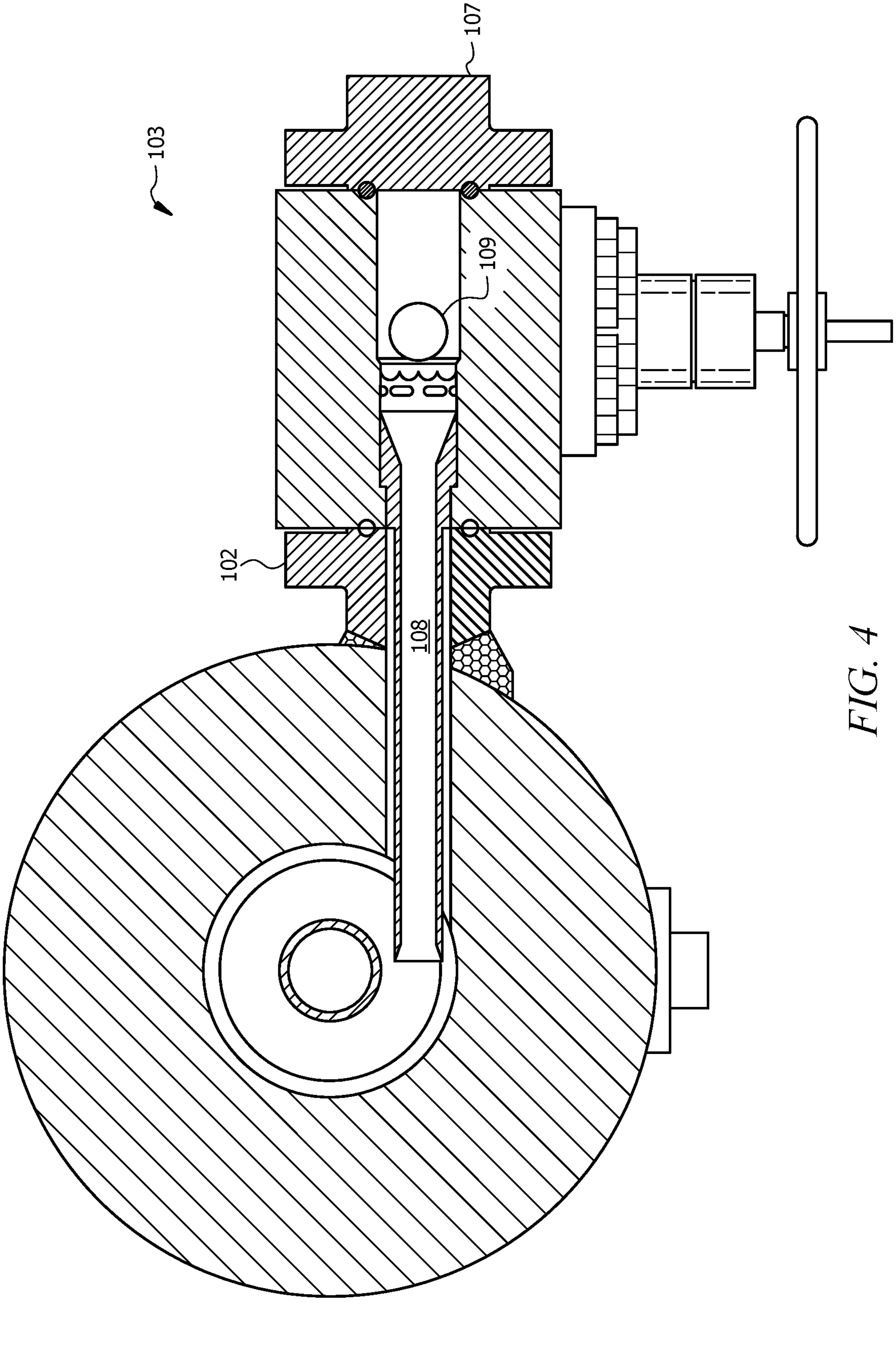
FIG. 4 is a cross-sectional view of a block adjuster in one embodiment.

FIG. 4 is a cross-sectional view of a block adjuster in one embodiment. The adjustment block 103 comprises a device which allows the nozzle size to be adjusted. FIG. 4 illustrates one embodiment which accomplishes this. The illustrative embodiment is for illustrative purposes only and should not be deemed limiting.

As noted, the adjustment block 103 comprises a cover 107. In this embodiment, the cover 107 must be removed to make the necessary adjustments. The cover 107 keeps the equipment safe and increases personnel safety.

FIG. 4 shows a flange 102 which is coupled to the adjustment block 103. The flange 102, in one embodiment, couples the adjustment block 103 to the separator 101. While a flange 102 is shown, this is for illustrative purposes only and should not be deemed limiting. Any feature which allows the adjustment block 103 to be coupled to the separator 101 can be utilized.

In one embodiment, the nozzle 108 is threaded and engages with the threads in the adjustment block 103. A tool is coupled with the entry point 109 to install and remove a specific nozzle 108. In one embodiment, the nozzle 108 comprises a removable nozzle. A removable nozzle is one which is not permanently affixed but instead is designed to be installed and removed such that other sized removable nozzles can be utilized.

As shown, there is a bore within the adjustment block 103 and the flange 102, as well as the separator 101 through which the nozzle 108 can be inserted and withdrawn.

Figure 5:
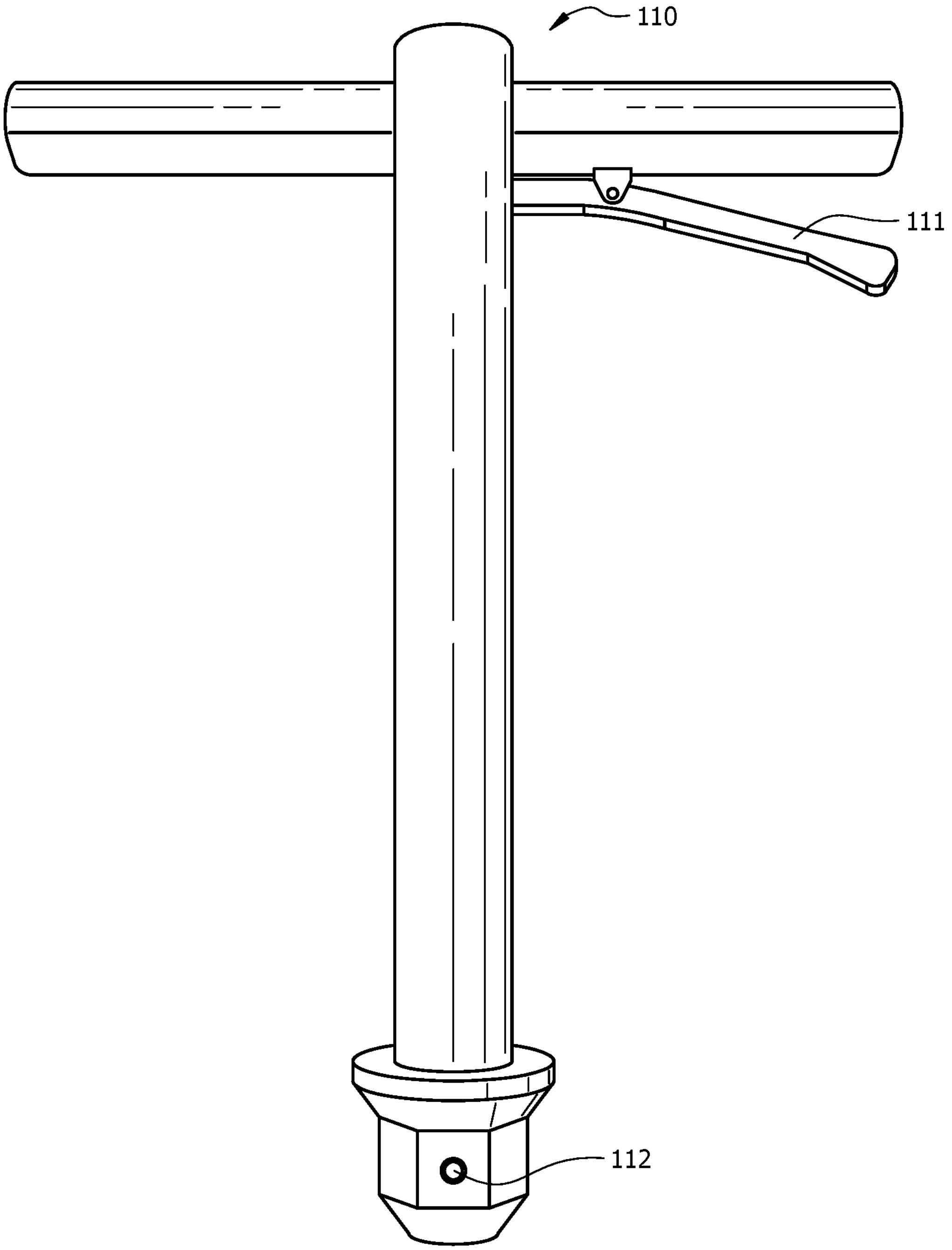
FIG. 5 is a perspective of a tool 110 in one embodiment.

Turning to FIG. 5, FIG. 5 is a perspective of a tool 110 in one embodiment. As shown the tool 110 can be inserted to the entry point 109 from FIG. 4. The tool 110 has a release handle 111 which is coupled to a coupler 112 at the far end of the tool 110. When the release handle 111 is manipulated, the coupler 112 moves in and out. The coupler 112, in some embodiments couples with a corresponding hole in the nozzle 108 body. The tool 110 grips and holds the nozzle 108 via the coupler 112 fitting within the hole of the nozzle 108 body. The tool 110 can then be used to remove the nozzle 108. The same process can be repeated to install and release the nozzle 108.

In one embodiment nozzles of various sizes can be utilized. As an example, in one embodiment the nozzle ranges from 0.5 to 4 inches. Thus, when the conditions of the inlet stream, such as flow rate and pressure, call for it, a nozzle with a diameter of 0.5 inches can be used. A 0.5-inch nozzle 108 is installed into the adjustment block 103. In one embodiment the nozzle 108 is installed by coupling the nozzle 108 to the adjustment block 103. The cover 107 is installed, and the valves are opened to allow flow through the adjustment block 103, through the nozzle 108, and into the separator. If the conditions of the inlet stream change such that a larger nozzle is beneficial, the user stops flow to the adjustment block 103, such as via the bypass 104. The user removes the cover 107. A tool is coupled to the entry point 108 to remove the 0.5-inch nozzle 108. Thereafter, a larger nozzle, such as a 2.0-inch nozzle 107 is then coupled to the adjustment block 103. The cover 107 is installed, and the inlet flow is returned to the adjustment block 103.

As noted, the adjustment block 103 allows the nozzle 108 size to be optimized depending upon the, often changing, parameters of the inlet stream. Previously a nozzle size was designed and fixed. Now, with the adjustment block 103, the users can modify the nozzle size as needed to optimize separation within the separator 101.

As depicted, and in one embodiment, the nozzle 108 extends within the separator by between about 0.5 to about 1 inch. This reduces wear on the nozzle 108 and the inner diameter of the separator 101.

As noted, the size of the nozzle determines the efficiency of separation within the separator 101. The nozzle size impacts the pressure drop, the velocity of the stream, the impact force, the number of rotations a fluid has within the separator 101, among other factors. Thus, the nozzle size directly impacts the efficiency of achieved separation within the separator 101.

Due to the ability to optimize separation efficiency by adjusting the nozzle size to account for varying parameters of the flow, the system and method can remove a D25 micron. D50 is the corresponding particle size when the cumulative percentage reaches 50%. D50 is also called the median particle diameter or mean particle size. As an example, a powder sample with D50 equites to 5 μm. This means that 50% of particles are larger than 5 μm and 50% of particles are smaller than 5 μm.

In one embodiment, by being able to control the velocity of the stream, by controlling the nozzle size, the system can achieve about 7 turns of rotation within the vortex head. This is where the rotation of the gas stream provides the separation. Increasing the number of turns a gas can rotate allows for finer material to fall out of the gas stream. As noted, in one embodiment, the system can remove D25 micron and above. Accordingly, D25 and below will pass through the sand separator. The D25 micron and below will have no effect on downstream production equipment. Thus, the system successfully removes larger particles which could potentially damage downstream production equipment. The system operates at optimized conditions as the nozzle size, which impacts many variables as addressed above, can be modified real-time as the stream conditions warrant. As noted, if prior nozzle sizes were optimized, they were only optimized for one point in one, i.e. one specific flow rate. Once the flow rate deviates, which is certain to happen, the flow nozzle is no longer optimized. Accordingly, separation is no longer optimized. If such a system cited a specific micron removal, then that is no longer accurate when the flow rate inevitably changes. In such situations, undesirably large particles will not be separated, which can damage downstream equipment.

In one embodiment the vortex head is tapered. As but one example, in one embodiment the top of the vortex head has a diameter of about 13⅝ of an inch whereas the bottom has a diameter of about 6⅛ of an inch. Thus, in one embodiment the top of the vortex head has an inner diameter which is at least twice the inner diameter at the bottom of the vortex head. This increases the number of rotations within the head.

As noted, in one embodiment the separator 101 comprises a chamber within the separator 101 collects the heavier components and stores them for subsequent removal. In one embodiment the chamber can hold one hundred pounds of sand per foot. In one embodiment where the chamber is 6 feet tall, the chamber can collect 600 pounds of sand and other undesirable components. Depending upon the flowrate of the stream, the chamber will need to be emptied once every 15 minutes, once and hour, once every two hours, etc. In some embodiments as much as 400 pounds of sand and other particulate has been removed in one hour with zero carry over.

As noted, while one embodiment shows a manual adjustment of the nozzle 108, this is for illustrative purposes only and should not be deemed limiting. In other embodiments, for example, a pneumatic or hydraulic system can be utilized which adjusts the nozzle size in real time. Thus, while FIG. 4 shows an embodiment where the nozzle 108 is manually replaced by hand, in other embodiments this replacement can be automated.

In still other embodiments, the system can utilize a hydraulic drilling choke. This allows the nozzle size orifice to be adjusted hydraulically. As but one example, the choke resembles a set of jaws which can clamp down upon an opening. The opening can then be adjusted from, for example, a nozzle size of 0.5-inches to four inches.

While a system for a sand trap has been discussed, this is for illustrative purposes only and should not be deemed limiting. In other embodiments the system is used to separate entrained components from a fluid stream. A sand trap is but one example of such a system.

While a system has been described, a method of optimizing separation within a separator 101 will now be addressed. In one embodiment the method utilizes a sand trap 100, wherein the sand trap comprises a separator 101. The system has an adjustment block 103 upstream of the separator 101 and an inlet stream 105 upstream the adjustment block 103. The method involves determining a first optimal diameter for a first removable nozzle 108. The determination can comprise using previous data, predictive analysis, calculations, etc. In one embodiment the determination is at least partly based on the flow rate of the inlet stream 105. As noted, the flow rate through a well, for example, can often fluctuate. As such, the optimal nozzle 108 size, which optimizes separation within the separator, can change based on the flow rate, and other factors.

Once a first optimal diameter for a first removable nozzle 108 is determined, the first removable nozzle 108 is installed in the adjustment block 103. This will achieve optimal separation within the separator. However, if a variable, such as flow rate, changes, the optimal diameter of the nozzle 108 will likewise change. Accordingly, a second optimal diameter for a second removable nozzle 108 is then determined. The first removable nozzle is then removed. This can involve utilizing the bypass 104 as discussed previously. The first removable nozzle 108, in some embodiments, is removed using a tool 110 depicted in FIG. 5.

Thereafter, the second removable nozzle 108, is installed. In some embodiments, the second removable nozzle 108 is installed using the tool 110 depicted in FIG. 5. In some embodiments the second removable nozzle 108 has a diameter, and the first removable nozzle 108 has a diameter, and the diameter of the second removable nozzle is dissimilar from the diameter of the first removable nozzle.

While the invention has been particularly shown and described with reference to a preferred embodiment, it will be understood by those skilled in the art that various changes in form and detail may be made therein without departing from the spirit and scope of the invention.

What is claimed is:

1. A system for a sand trap, said system comprising:
a separator;
an adjustment block upstream of said separator;
an inlet stream upstream of said adjustment block;
wherein said adjustment block comprises a first removable nozzle.

2. The system of claim 1 wherein said adjustment block comprises a flange, and wherein said first removable nozzle extends through said flange.

3. The system of claim 1 wherein said first removable nozzle has a diameter of between 0.5 and 4 inches.

4. The system of claim 1 wherein said adjustment block comprises a cover which provides access to said first removable nozzle.

5. The system of claim 1 further comprising a bypass which bypasses flow away from said adjustment block.

6. The system of claim 1 wherein said first removable nozzle extends between 0.5 to about 1 inch into said separator.

7. The system of claim 1 wherein said separator comprises a vortex head and a chamber.

8. The system of claim 1 wherein said vortex head is tapered.

9. The system of claim 1 wherein said vortex head has a top end with an inner diameter, and a bottom end with an inner diameter, and wherein said inner diameter at said top end is more than twice of the inner diameter at the bottom end.

10. The system of claim 1 further comprising a tool for removing and installing said first removable nozzle.

11. The system of claim 10 wherein said tool has a release handle and a coupler to couple with said first removable nozzle.

12. The system of claim 1 wherein said nozzle is coupled to a hydraulic drilling choke for adjusting said first removable nozzle.

13. The system of claim 1 further comprising a second removable nozzle, wherein said second removable nozzle comprises a diameter, and wherein said first removable nozzle comprises a diameter, and wherein the diameter of the second removable nozzle is dissimilar from the diameter of the first removable nozzle.

14. The system of claim 1 utilized on a fracturing sand trap.

15. A method of using a sand trap, wherein the sand trap comprises a separator, an adjustment block upstream of said separator, an inlet stream upstream of said adjustment block, wherein said method comprises the steps of:
a) determining a first optimal diameter for a first removable nozzle;
b) installing said first removable nozzle into said adjustment block;
c) determining a second optimal diameter for a second removable nozzle;
d) removing said first removable nozzle from said adjustment block;
e) installing said second removable nozzle.

16. The method of claim 15 wherein said determining of step a) is determined, at least in part, by considering a flow rate of said inlet stream.

17. The method of claim 15 wherein installing comprises coupling said first removable nozzle with a tool to place the first removable nozzle in a desired location, and then decoupling to remove said tool.

18. The method of claim 15 further comprising the step of stopping flow through said adjustment block via a bypass prior to removing of step d).

19. The method of claim 15 wherein said second removable nozzle comprises a diameter, and wherein said first removable nozzle comprises a diameter, and wherein the diameter of the second removable nozzle is dissimilar from the diameter of the first removable nozzle.

20. The method of claim 15 wherein said determining of step a) and b) comprises determining the optimal nozzle size to maximize separation within the sand trap.

* * * * *